(12) United States Patent
Lutgardo et al.

(10) Patent No.: US 9,787,524 B1
(45) Date of Patent: Oct. 10, 2017

(54) FIBRE CHANNEL VIRTUAL HOST BUS ADAPTER

(75) Inventors: Alberto Lutgardo, Santa Clara, CA (US); Robert N. Snively, Morgan Hill, CA (US)

(73) Assignee: Brocade Communications Systems, Inc., San Jose, CA (US)

( * ) Notice: Subject to any disclaimer, the term of this patent is extended or adjusted under 35 U.S.C. 154(b) by 3716 days.

(21) Appl. No.: 10/201,331

(22) Filed: Jul. 23, 2002

(51) Int. Cl.
*G06F 15/173* (2006.01)
*H04L 29/08* (2006.01)

(52) U.S. Cl.
CPC .............................. *H04L 29/08144* (2013.01)

(58) Field of Classification Search
None
See application file for complete search history.

(56) References Cited

U.S. PATENT DOCUMENTS

| | | | |
|---|---|---|---|
| 5,420,988 A * | 5/1995 | Elliott | 712/300 |
| 5,490,007 A * | 2/1996 | Bennett et al. | 398/52 |
| 5,598,541 A | 1/1997 | Malladi | |
| 6,070,200 A | 5/2000 | Gates et al. | |
| 6,343,324 B1 * | 1/2002 | Hubis et al. | 709/229 |
| 6,353,612 B1 * | 3/2002 | Zhu et al. | 370/360 |
| 6,400,730 B1 * | 6/2002 | Latif et al. | 370/466 |
| 6,684,209 B1 * | 1/2004 | Ito et al. | 707/783 |
| 6,785,742 B1 * | 8/2004 | Teow et al. | 710/1 |
| 6,834,311 B2 * | 12/2004 | Rao | 370/352 |
| 7,089,281 B1 * | 8/2006 | Kazemi et al. | 709/203 |
| 2002/0083339 A1 * | 6/2002 | Blumenau et al. | 713/201 |
| 2002/0103913 A1 * | 8/2002 | Tawil et al. | 709/229 |
| 2003/0103504 A1 | 6/2003 | Dugan et al. | |
| 2003/0126344 A1 * | 7/2003 | Hodapp, Jr. | 710/306 |
| 2003/0131182 A1 * | 7/2003 | Kumar et al. | 711/5 |
| 2003/0135620 A1 * | 7/2003 | Dugan et al. | 709/226 |
| 2005/0010688 A1 * | 1/2005 | Murakami et al. | 709/245 |

FOREIGN PATENT DOCUMENTS

WO 98/36537 A1 8/1998

OTHER PUBLICATIONS

Fibre Channel Physical and Signaling Interface (FC-PH) Rev 4.3; Working draft proposed American National Standard for Information Systems; Jun. 1, 1994; pp. Start-14, 133-159 and 170-203.
American National Standard for Information Technology—Fibre Channel Generic Services—2 (FC-GS-2); ANSI NCITS 288-1999; pp. Start-4, and 15-42.
American National Standard for Information Technology—Fibre Channel-Generic Services—3 (FC-GS-3); ANSI NCITS 348-2001; pp. Start-8, and 29-92.
Fibre Channel Generic Services—4 (FC-GS-4) Rev 7.1; NCITS working draft proposed American National Standard for Information Technology; Sep. 19, 2001; pp. Start-9 and 31-86.

* cited by examiner

*Primary Examiner* — Phuongchau Ba Nguyen
(74) *Attorney, Agent, or Firm* — Blank Rome, LLP

(57) ABSTRACT

Methods and devices to allow multiple operating system images to simultaneously access a Fiber Channel fabric through a common host bus adapter port are described. For each requesting operating system image, a fabric switch maintains a unique port identifier value and a unique fabric channel address so that each operating system image may be uniquely identified across the fabric.

62 Claims, 5 Drawing Sheets

FIBRE CHANNEL VIRTUAL HOST BUS ADAPTER

BACKGROUND OF THE INVENTION

Field of the Invention

The invention relates generally to data transmission in a Fibre Channel network and more particularly, but not by way of limitation, to techniques for allowing a plurality of operating system images (and applications executing therein) to simultaneously access a single server-side Fibre Channel port.

As used herein, the phrase "Fibre Channel" refers to the Fibre Channel family of standards promulgated by the American National Standards Institute as ANSI X.3/T11. In general, Fibre Channel defines a high speed serial transport system that uses a hierarchically structured information exchange protocol consisting of frames, sequences and exchanges. A "frame" is the atomic unit of data transmission between two communicating devices. A "sequence" is a set of one or more related data frames transmitted unidirectionally from one device to another device within an exchange. An "exchange" is the basic construct for coordinating the transfer of information between communicating devices during higher layer protocol operations such as Small Computer System Interface (SCSI) and Transport Control Protocol/Internet Protocol (TCP/IP).

Referring to FIG. 1, conventional Fibre Channel network 100 may comprise server 105, Fibre Channel switch 110 and storage system 115 coupled by Fibre Channel links 120 and 125. Server 105 may comprise a desktop personal computer, a computer workstation or a mainframe computer. Similarly, storage system 115 may comprise a disk array, a tape backup system, a tape library, a CD-ROM library or a JBOD (Just a Bunch of Disks) system. More specifically, operating system (OS) 130 executing on server 105 communicates with storage system 115 through port 135, ports 140 and 145 on Fibre Channel switch 110 and port 150 on storage system 115. A port is a connector and supporting logic for one end of a Fibre Channel link such as links 120 and 125. As shown, server and storage system ports are provided via host bus adapters 155 and 160. Conceptually, host bus adapters may be thought of as functional analogs to network interface cards (NIC) used to facilitate communication in a conventional Ethernet-based local area network configuration. Ports are named to describe their function within the system. For example, an N_Port is a connection between an off-fabric device such as server 105 or storage system 115 to a Fibre Channel "fabric," where a fabric is generally described as one or more Fibre Channel switches operatively coupled to provide message and data routing between and among off-fabric devices. In system 100, ports 135 and 150 are N_Ports and fabric 165 comprises switch 110. An F_Port designates a connection between a fabric switch such as switch 110 and an off-fabric device such as server 105 and storage system 115. In system 100, ports 140 and 145 are F_Ports.

As the processing power of computer platforms has increased, it has become possible to support the simultaneous execution of multiple OS images in a single "box," such as server 105. This raises the need for each OS executing on a common platform (be it multiple instantiations of a common OS or different OS's altogether) to be able to communicate in a unique, one-to-one fashion, with fabric devices—storage system 115, for example. In prior Fibre Channel network techniques, when a first OS establishes communication through a specific port (e.g., N_Port 135) on a given adapter (e.g., host bus adapter 155), the port's address is mapped to unique WWN (World-Wide Name) identifier and Fibre Channel addresses. Subsequent operating systems cannot thereafter obtain unique identifiers and, as a result, are not able to "share" the port with the first OS. Thus, it would be beneficial to provide a mechanism to allow multiple operating system images executing on a single computer platform to share a common Fibre Channel port.

BRIEF SUMMARY OF THE INVENTION

In one embodiment the invention provides a method to allow multiple operating system images to simultaneously share a common host bus adapter port. The method includes receiving a first frame from a first operating system image through a port coupled to a host bus adapter port, logging the first operating system image onto a Fibre Channel network, receiving a second frame from a second operating system image through the port coupled to the host bus adapter port, the second frame having a non-zero port identifier value, and logging the second operating system image onto the Fibre Channel network. Additional aspects of the invention include sending Fibre Channel accept frames to each operating system image requesting fabric login, updating fabric name service functions and the provision for use of the claimed techniques within secure fabrics or subfabrics. The invention may be embodied in computer programs or fabric channel switch devices.

DETAILED DESCRIPTION OF THE INVENTION

The invention relates generally to data transmission in a Fibre Channel network and more particularly to sharing a single Fibre Channel port among and between a plurality of operating system (OS) images executing on a common platform. In general, a host bus adapter (HBA) in accordance with the invention interacts with a Fibre Channel's operating system (executing on a fabric channel switch device) to associate a unique fabric-wide identifier with each of the plurality of OS images. As a result, techniques in accordance with the invention provide a "virtual port" capability such that each of the plurality of OS images may communicate with fabric-connected devices/applications through a single port independently and transparently from other OS images executing on the same platform using the same port.

The following descriptions are presented to enable a person of ordinary skilled in the art to make and use the invention and are provided in the context of a host bus adapter having a single port. Various modifications to the described embodiments will be readily apparent to those skilled in the art and the general principles defined herein may be applied to other embodiments and applications without departing from the spirit and scope of the invention. Accordingly, the present invention is not intended to be limited to the specific embodiments described and, in particular, to a single port host bus adapter, but is to be accorded the widest scope consistent with the principles and features disclosed herein.

Figure 1:
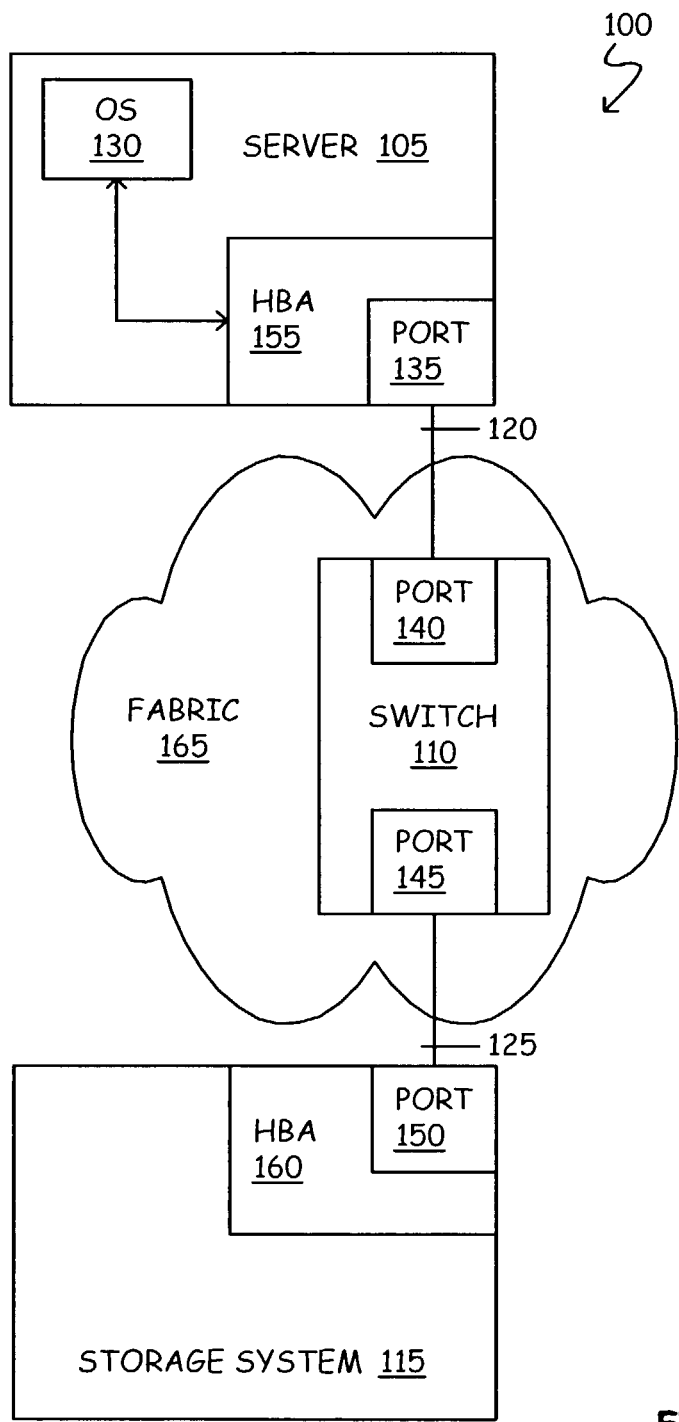
FIG. 1 shows, in block diagram form, a prior art Fibre Channel network.
Figure 2:
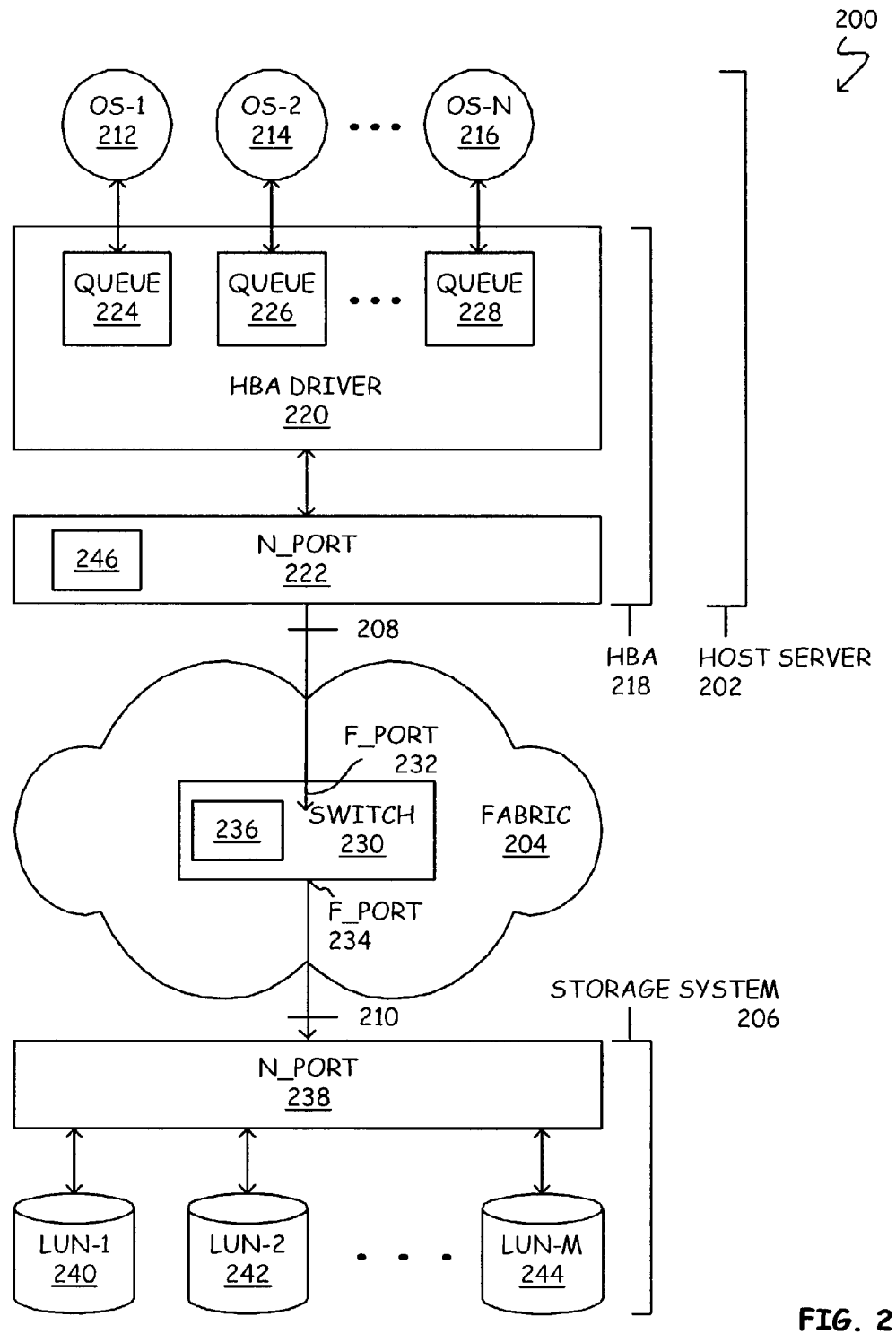
FIG. 2 shows, in block diagram form, an illustrative Fibre Channel network in accordance with one embodiment of the invention.

Referring to FIG. 2, Fibre Channel network 200 in accordance with one embodiment of the invention includes host server 202, fabric 204 and storage system 206, wherein Fibre Channel link 208 couples host server 202 to fabric 204 and Fibre Channel link 210 couples fabric 204 to storage system 206. As illustrated, host server 202 supports the simultaneous execution of a plurality of OS images (212-216) that communicate with storage system 206 through host bus adapter (HBA) 218. Host bus adapter 218 may itself be comprised of HBA driver 220 for facilitating the transmission of information between the various OS images and fabric-connected devices by associating unique fabric-wide identifiers to each OS image, and N_Port 222 for facilitating the physical transmission of information between HBA 218 and fabric 204. In the embodiment shown, HBA driver 220 includes a plurality of queues (224-228) through which the OS images communicate with HBA 218 and storage 246 for retaining operational data and/or instructions (see discussion below). In another embodiment, queues 224-228 may reside within the kernel space of host server 202. In yet another embodiment, there may be more than one queue associated with each OS image. For example, there may be one queue through which an OS image submits input-output (I/O) requests and another queue through which the same OS image receives a response. In still other embodiments, some or all of the aforementioned queues may be implemented through direct memory access (DMA) memory structures between HBA 218 and host server 202 kernel space. Also as shown, fabric 204 includes fabric channel switch 230 having F_Ports 232 and 234 and fiber login processing capabilities and databases 236. Finally, storage system 206 includes N_Port 238 to facilitate the physical transmission of information between storage system 206 and fabric 204 and a plurality of storage units (240-244) identified by their Logical Unit Number (LUNs).

It will be recognized by one of ordinary skill in the art that illustrative system 200 may comprise additional and/or different components. For example, fabric 204 may include a plurality of Fibre Channel switches. In addition, fabric-capable devices other than host server 202 and storage system 206 may be coupled via fabric 204. It will further be recognized that host server 202 may comprise, for example, a desktop personal computer, a computer workstation, a mainframe computer or a microprocessor based device and that storage system 206 may comprise substantially any non-volatile storage system such as, for example, a disk array, a tape backup system, a tape library, a CD-ROM library or a JBOD (Just a Bunch of Disks) system any one of which may, or may not, utilize LUNs to identify their internal storage compartmentalization. Finally, OS images 212-216 may comprise a combination of one or more of any operating system such as, for example, zOS from the International Business Machines corporation of Armonk, N.Y., Linux® (a registered trademark of Linus Torvalds), or Windows® from the Microsoft Corporation of Redmond, Wash.

Figure 3:
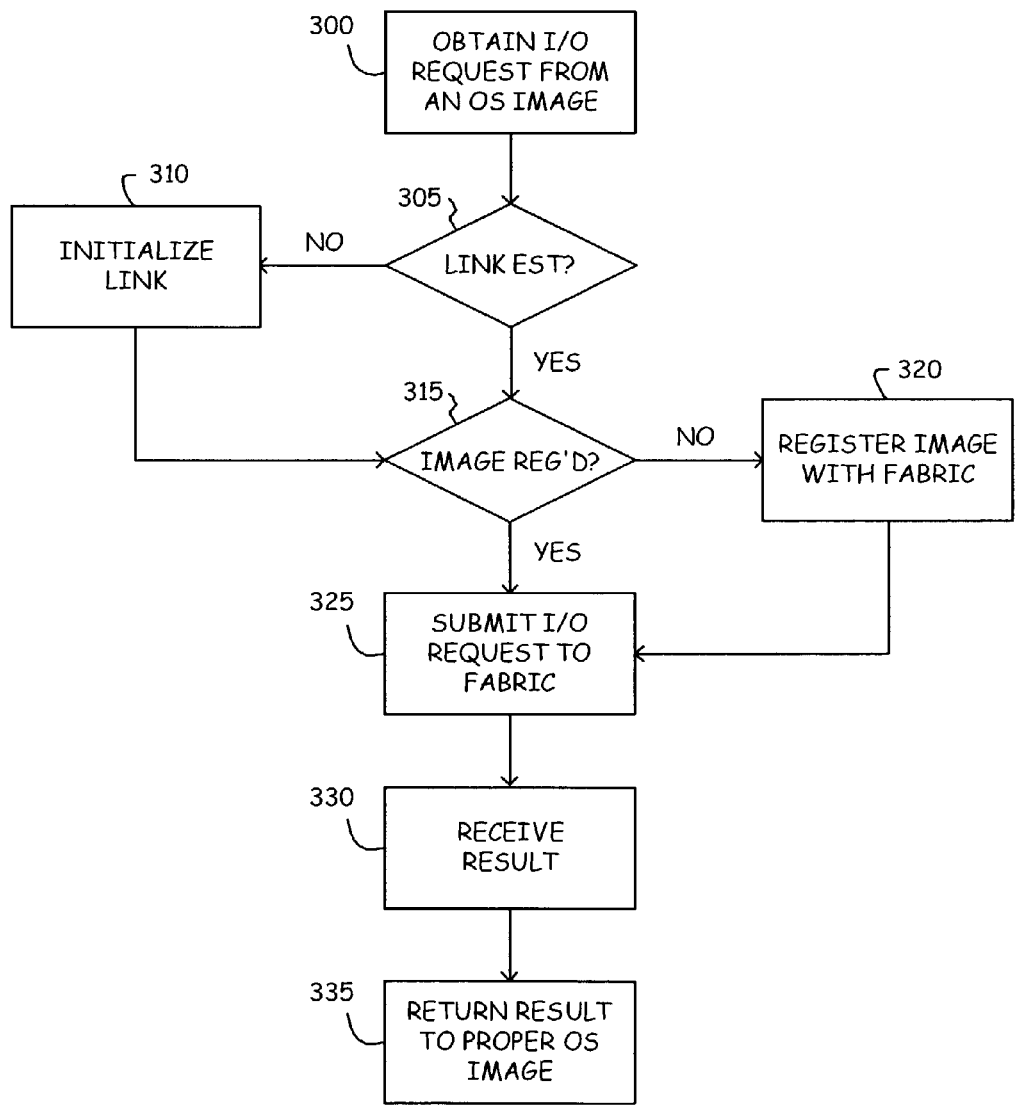
FIG. 3 shows, in flowchart form, a host-side process in accordance with one embodiment of the invention.

Referring to FIG. 3, a host-side or HBA-centered technique in accordance with the invention includes obtaining an I/O request from one of the potentially many OS images (e.g., one of OS images 212-216) executing on host server 202 (block 300). For example, the OS image may use the appropriate one of queues 212-216 to indicate it has an I/O request that needs processing. In one embodiment, the OS causes HBA driver 220 to be notified of the request. In another embodiment, HBA driver 220 periodically polls the various I/O request queues in a predetermined pattern and/or in accordance with a specified priority scheme.

Having obtained an I/O request, HBA driver 220 determines if link 208 between itself and fabric 204 has been established (diamond 305). If link 208 has not been established (the "no" prong of diamond 305), it is established n accordance with standard Fibre Channel procedures (block 310). If link 208 has been established (the "yes" prong of diamond 305) or after the acts of block 310, HBA driver 220 determines if the OS image that issued the I/O request has previously been registered in accordance with the invention (diamond 315). That is, HBA driver 220 determines if it has previously associated the OS image making the I/O request with a unique fabric-wide identifier such that it may communicate with, for example, storage system 206 through N_Port 222 without interference from other OS images executing on host server 202 using the same N_Port 222. In one embodiment, HBA driver 220 maintains a database in storage 246 that associates an OS image identifier unique to host server 202 with a unique fabric-wide identifier such as, for example, a fabric address and/or one or more world wide name (WWN) identifiers.

Figure 4:
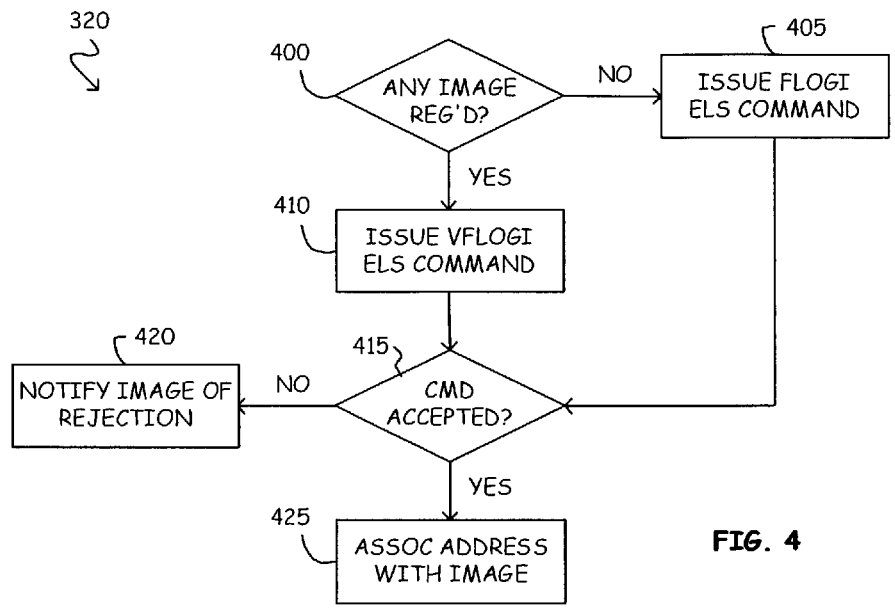
FIG. 4 shows, in flowchart form, an illustrative host-side process in accordance with one embodiment of FIG. 3.
Figure 6:
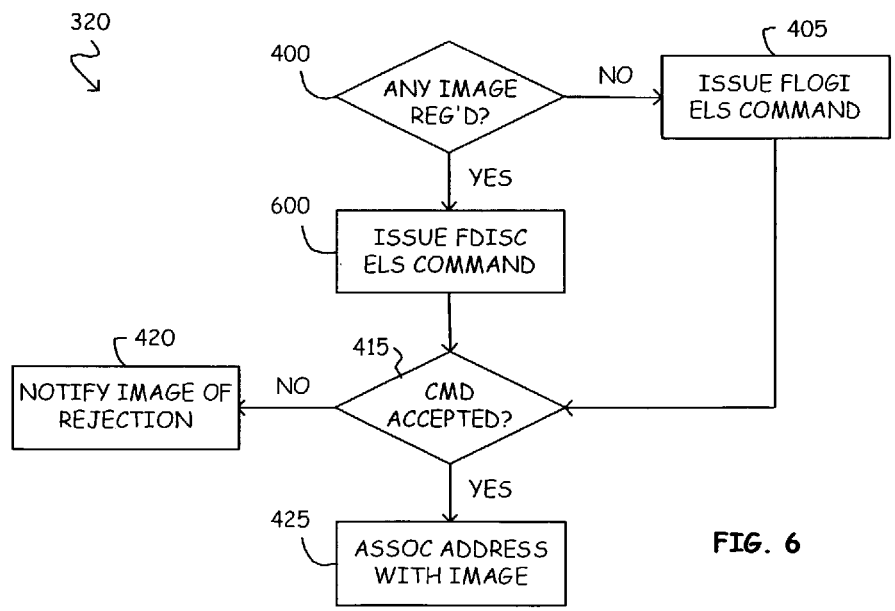
FIG. 6 shows, in flowchart form, an illustrative host-side process in accordance with another embodiment of FIG. 3.
Figure 5:
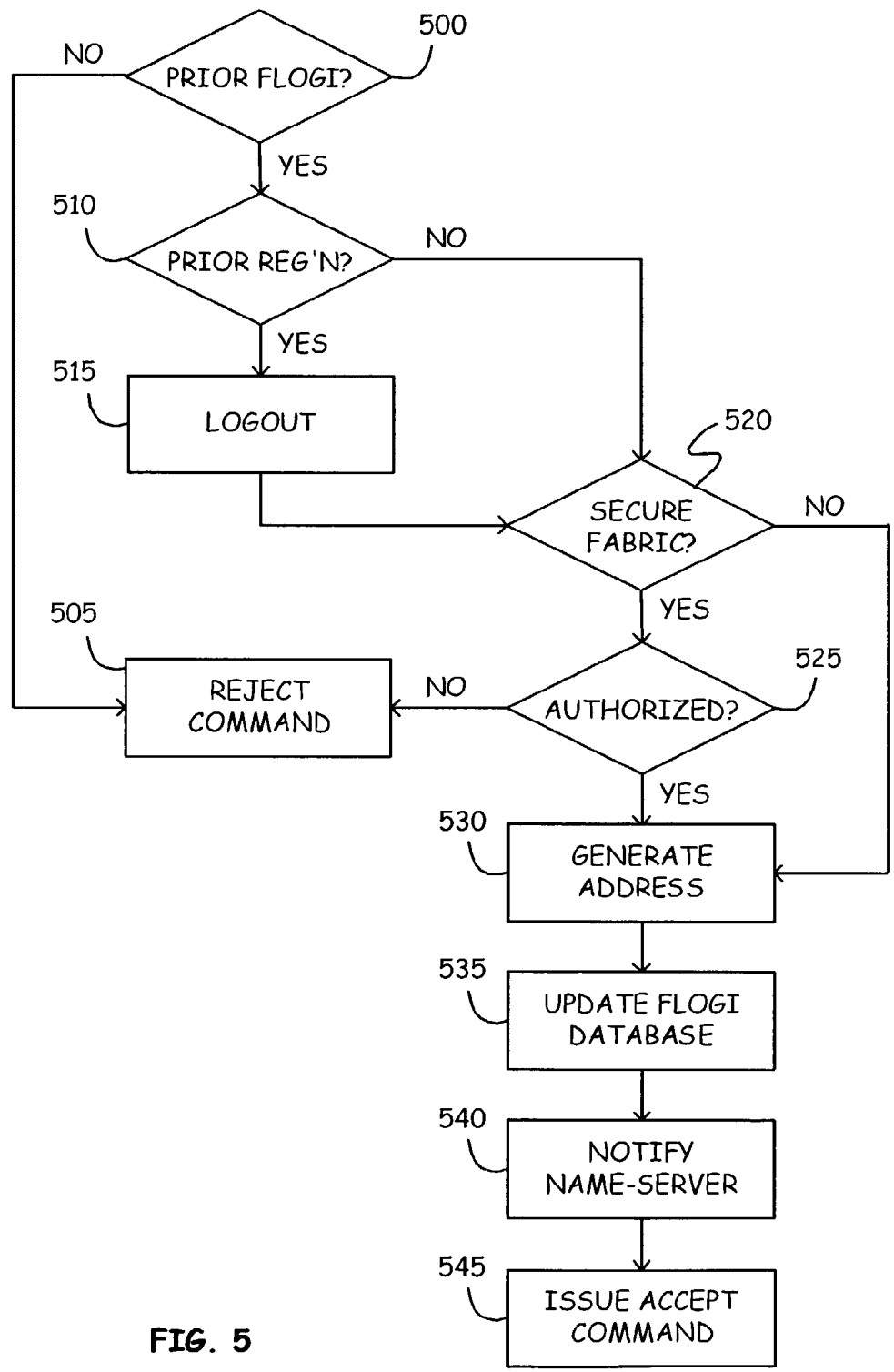
FIG. 5 shows, in flowchart form, an illustrative switch-side process for proving virtual port capability in accordance with FIG. 4.

If the requesting OS image has not been associated with a unique fabric-wide identifier by HBA driver 220 (the "no" prong of diamond 315), HBA driver 220 communicates with switch 230 (via N_Port 222 and F_Port 232) to obtain a unique identifier for the OS image in accordance with the invention (block 320). Illustrative embodiments of this process are discussed below and are illustrated in FIGS. 4, 5 and 6. If the requesting OS image has been associated with a unique fabric-wide identifier by HBA driver 220 (the "yes" prong of diamond 315) or after the acts of block 320, HBA driver 220 creates a standard Fibre Channel frame for the I/O request using the image's assigned unique fabric-wide identifier (and associated port WWN value) as the request's "source" address and submits that frame to N_Port 222 for delivery to fabric 204 (block 325). Following the acts of block 225, HBA driver 220 is free to process frames received from fabric 204 via N_Port 222 and/or I/O requests from other OS images.

When a frame is received from fabric 204 through N_Port 222 that is in response to the OS image's I/O request (block 330), HBA driver 220 forwards the reply data to the requesting OS image (block 335). As in the acts of block 325, HBA driver 225 can identify which of the plurality of OS images should receive the returned data by using the returned data's Fibre Channel frame's destination address field. In one embodiment, HBA driver 220 places the I/O request's returned data in an I/O return queue associated with the requesting OS image (not shown in FIG. 2). Each OS image may periodically interrogate such queues or HBA driver 220 may notify the OS image of the delivery through an interrupt technique. In another embodiment, HBA driver 220 places the I/O request's returned data in storage accessible to the OS image via direct memory access (DMA) methods, and then notifies the OS image through an interrupt technique.

In one embodiment, HBA driver 220 registers each OS image making an I/O request (the acts of block 320) in accordance with the process outlined in FIG. 4. Initially, HBA driver 220 determines if it has registered any OS image (diamond 400). As discussed above, HBA driver 220 may maintain a database in storage 246, for example, in which it records and associates OS image identifiers (obtained from, for example, the OS image itself) with fabric-wide identifiers (obtained from, for example, fabric 204). Thus, if any OS image has registered with HBA drive 220, it will be noted in this database. In one embodiment such a database may include, for each OS image, the image's host-specific identifier, the image's unique fabric-wide identifier or address, a node World Wide Name (WWN) identifier and a port WWN identifier. In some embodiments, HBA driver 220 may be populated with a predetermined number of precomputed port and/or node WWN values. For example, HBA driver 220 may include a table of WWN values, the number of which may determine the maximum number of OS images that may simultaneously use N_Port 222. Such a table of values would typically be provided by the manufacturer of HBA 218. In those embodiments incorporating predefined WWN values, such values may be stored in electrically programmable read-only memory (EPROM), electrically erasable programmable read-only memory (EEPROM), FLASH memory or any other non-volatile memory that the designer chooses and which is accessible to HBA driver 220. In other embodiments, HBA driver 220 may dynamically compute (or obtain from another source) port and/or node WWN values for each OS image as each image registers with HBA driver 220. If HBA driver 220 computes WWN values as needed, it may do so using well-known procedures.

If no image has previously registered with HBA driver 220 (the "no" prong of diamond 400), HBA driver 220 generates a standard Fibre Channel FLOGI command frame and includes in that frame the port WWN assigned to the requesting OS image (block 405). As would be known to one of ordinary skill in the art of Fibre Channel network design, the FLOGI command is a link service command that allows a device to log onto/into a fabric and are sent to the well-known address FFFFFEh with a source identifier of 0x0. In accordance with Fibre Channel standards, an accepted FLOGI command results in the fabric issuing a unique fabric-wide identifier or address to the requesting device identified by the FLOGI frame's port WWN value.

If at least one image has previously registered with HBA driver 220 (the "yes" prong of diamond 400), HBA driver 220 generates a vFLOGI command frame in accordance with the invention (block 410). In one embodiment, the vFLOGI frame is a new Fibre Channel link service command that has the same payload and accept response as the FLOGI command. However, as a new Fibre Channel command type, the fabric (i.e., the Fibre Channel switch receiving the vFLOGI command such as switch 230) would process the vFLOGI command in accordance with the process outlined in FIG. 5 and discussed below. If either the FLOGI (via block 405) or vFLOGI (via block 410) commands are rejected by switch 230 (the "no" prong of diamond 415), the requesting device (i.e., HBA driver 220) is notified and OS image registration halts (block 420). If the FLOGI or vFLOGI commands are accepted (the "yes" prong of diamond 415), the unique fabric-wide identifier or address provided as part of the accept command frame is associated with the image's host-specific identifier and port WWN value in an HBA database retained in, for example, storage 246 (block 425).

Referring now to FIG. 5, a switch-based reply process for the proposed vFLOGI link service command is shown. If a prior FLOGI command for the vFLOGI's identified port WWN has not been received (the "no" prong of diamond 500), the vFLOGI command is rejected (block 505). If a prior FLOGI command for the vFLOGI's identified port WWN has been received (the "yes" prong of diamond 500), the receiving switch checks its FLOGI database 236 to determine if the vFLOGI's port WWN has already been associated with a Fibre Channel address (diamond 510). If the port WWN value included in the vFLOGI's payload by HBA driver 220 has already been registered, that is, the switch's FLOGI database has a Fibre Channel address associated with the vFLOGI's port WWN value (the "yes" prong of diamond 510), the FLOGI database entry is removed and the fabric's name service is notified (block 515). This, in effect, logs the device (e.g., OS image) associated with the port WWN out of, or off, the fabric (an implicit logout). If the vFLOGI's port WWN has not been registered (the "no" prong of diamond 510) or following the acts of block 515, the switch determines if the vFLOGI command targets a secure fabric (diamond 520). If the login does target a secure fabric (the "yes" prong of diamond 520) and the vFLOGI's port WWN is not on the targeted fabric's access control list (the "no" prong of diamond 525), the vFLOGI command is rejected (block 505). If either the vFLOGI does not target a secure fabric (the "no" prong of diamond 520) or the vFLOGI's port WWN is on the targeted fabric's access control list (the "yes" prong of diamond 525), the switch generates a unique fabric-wide address for the requesting port WWN in accordance with established Fibre Channel techniques (block 530). Once generated, the switch updates its FLOGI database 236 to associate the vFLOGI's port WWN with the newly generated Fibre Channel address (block 535), notifies the fabric's name service of the new "device" (block 540) and issues an accept link service command to HBA 218 in which the newly generated Fibre Channel address is passed (block 545). A benefit of this approach is that a new Fibre Channel defined link service command (i.e., frame) clearly and cleanly allows multiple devices to share a common N_Port. A drawback to this approach is that to get a new link service command adopted requires that the Fibre Channel standard be modified.

In another embodiment, HBA driver 220 registers each OS image making an I/O request (the acts of block 320) in accordance with the process outlined in FIG. 6. Rather than use a new link service command (such as the proposed vFLOGI command discussed above and in FIGS. 4 and 5), this approach issues a Fibre Channel FDISC link service command for all OS images registering with RBA driver 220 except the first (block 600). In this embodiment, the source identifier field in the HBA driver issued FDISC command is set to 0x0. Since the conduct of switch 230 is not specified by the Fibre Channel standard when it receives an FDISC command with a source identifier value of 0x0, the invention includes the switch-specific process outlined above in FIG. 5. That is, when switch 230 receives an FDISC command whose source identifier field has a 0x0 value on F_Port 238, it processes the command in accordance with FIG. 5. One benefit of this approach is that no modifications to existing Fibre Channel standards need to be proposed or implemented. Because the behavior of a switch receiving an FDISC link service command (i.e., frame) with a source identifier value set to 0x0 is not defined, switch and HBA providers/manufacturers are free to implement the inventive process without fear of deviating from the Fibre Channel standard.

Various changes in the materials and components as well as in the details of the illustrated operational methods are possible without departing from the scope of the claims. For instance, the illustrative system of FIG. 2 may include additional devices and HBA 218 may include more than one Fibre Channel port (N_Port 222). Similarly, HBA driver 220 may include more or fewer queues than illustrated in FIG. 2. In some embodiments, for example, only a single queue is provided and is shared by all instantiated OS images. In other embodiments, one queue may be provided for each "class" or OS image, where a class may be determined in accordance with a priority scheme. In still other embodiments, more than one queue may be associated with each OS image. Further, queues 212-216 may be incorporated within HBA (as suggested by FIG. 2) or external to, but accessible by, the HBA's programmable control device. In like fashion, the HBA database described in connection with FIGS. 3, 4 and 6 may be incorporated within HBA (e.g., in storage 246) or external to, but accessible by HBA driver 220.

In addition, acts in accordance with FIGS. 3, 4 and 6 may be performed by a host bus adapter implemented using one or more programmable control devices such as, for example, microprocessors or custom designed state machines. Custom designed state machines may be embodied in hardware devices such as printed circuit boards comprising discrete logic, integrated circuits, or specially designed application specific integrated circuits (ASICs). Similarly, acts in accordance with FIG. 5 may be performed by Fibre Channel switch hardware, software (e.g., driver routines associated with fiber login processing capabilities and databases 236) or a combination of these resources. Storage devices suitable for tangibly embodying program instructions to implement some or all of the methods illustrated in FIGS. 3-5 include all forms of non-volatile memory including, but not limited to: semiconductor memory devices such as EPROM, EEPROM, and flash devices; magnetic disks (fixed, floppy, and removable); other magnetic media such as tape; and optical media such as CD-ROM disks.

While the invention has been disclosed with respect to a limited number of embodiments, numerous modifications and variations will be appreciated by those skilled in the art. It is intended, therefore, that the following claims cover all such modifications and variations that may fall within the true sprit and scope of the invention.

The invention claimed is:

1. A Fibre Channel network login method, comprising:
    receiving a first frame from a first operating system image through a port coupled to a host bus adapter port;
    logging the first operating system image onto a Fibre Channel network in response to the first frame;
    receiving a second frame from a second operating system image through the port coupled to the host bus adapter port, the second frame having a non-zero port identifier value; and
    logging the second operating system image onto the Fibre Channel network in response to the second frame.

2. The method of claim 1, wherein the act of receiving a first frame comprises receiving a first Fibre Channel login (FLOGI) frame having a first non-zero port identifier value.

3. The method of claim 2, wherein the FLOGI frame has a zero source device identifier value.

4. The method of claim 1, wherein the act of receiving a second frame comprises receiving a second Fibre Channel link service frame.

5. The method of claim 1, wherein the act of receiving a second Fibre Channel frame comprises determining if the non-zero port identifier value is associated with a prior Fibre Channel address and, if it is, removing the association between the non-zero port identifier value and the prior Fibre Channel address.

6. The method of claim 5, wherein the act of removing the association comprises updating a Fibre Channel login (FLOGI) database to remove the association between the non-zero port identifier value and the prior Fibre Channel address.

7. The method of claim 6, further comprising updating a name service database to remove the association between the non-zero port identifier value and the prior Fibre Channel address.

8. The method of claim 1, wherein the act of receiving a non-zero port identifier value comprises receiving a non-zero port world-wide name identifier value.

9. A Fibre Channel switch device, comprising:
    a port for coupling to a host bus adapter port;
    a database means for storing at least a portion of a Fibre Channel login (FLOGI) database;
    a control means for executing program instructions; and
    a storage means, readable by the control means, having instructions for causing the control means to:
        receive a first frame from a first operating system image coupled to the host bus adapter port through the port, the first frame having a first non-zero port identifier value,
        log the first operating system image into a Fibre Channel network in response to the first frame,
        receive a second frame from a second operating system image coupled to the host bus adapter port through the port, the second frame having a second non-zero port identifier value, and
        log the second operating system image into the Fibre Channel network in response to the second frame.

10. The Fibre Channel switch device of claim 9, wherein the instructions to log the first operating system image into a Fibre Channel network comprise instructions to:
    obtain a first new Fibre Channel address value;
    associate the first new Fibre Channel address value and the first non-zero port identifier value in the database means.

11. The Fibre Channel switch device of claim 10, further comprising instructions to send an accept frame to the first operating system image, the accept frame including the first non-zero port identifier value and the first new Fibre Channel address value.

12. The Fibre Channel switch device of claim 11, further comprising instructions to update a name service database with the first non-zero port identifier value and the first new Fibre Channel address value.

13. The Fibre Channel switch device of claim 9, wherein the instructions to receive a second frame further comprise instructions to determine if the second non-zero port identifier value is associated with a prior Fibre Channel address in the database means and, if it is, remove the association between the second non-zero port identifier value and the prior Fibre Channel address.

14. The Fibre Channel switch device of claim 13, further comprising instructions to update a name service database to remove the association between the second non-zero port identifier value and the prior Fibre Channel address.

15. The Fibre Channel switch device of claim 9, wherein at least a portion of the database means comprises a Fibre Channel login (FLOGI) database.

16. The Fibre Channel switch device of claim 9, wherein the instructions to receive first and second frames comprise instructions to receive non-zero port world-wide name identifier values.

17. The Fibre Channel switch device of claim 9, wherein the instructions to receive a first frame comprise instructions to receive a Fibre Channel login (FLOGI) link service frame.

18. The Fibre Channel switch device of claim 17, wherein the FLOGI frame includes a zero source device identifier value.

19. A Fibre Channel network login method, comprising:
receiving a first frame indicating a fabric login request through a port coupled to a device port;
logging the device onto a Fibre Channel network a first time;
receiving a second frame indicating a fabric login request through the port coupled to the device port while the device is logged onto the Fibre Channel network; and
logging the device onto the Fibre Channel network a second time while still logged on a first time.

20. The method of claim 19, wherein the act of receiving a first frame comprises receiving a first Fibre Channel login (FLOGI) frame having a first non-zero port identifier value.

21. The method of claim 19, wherein the act of receiving the second frame comprises receiving a frame having a second non-zero port identifier value.

22. The method of claim 21, wherein the act of receiving a second Fibre Channel frame comprises determining if the non-zero port identifier value is associated with a prior Fibre Channel address and, if it is, removing the association between the non-zero port identifier value and the prior Fibre Channel address.

23. The method of claim 22, wherein the act of removing the association comprises updating a Fibre Channel login (FLOGI) database to remove the association between the non-zero port identifier value and the prior Fibre Channel address.

24. The method of claim 21, further comprising updating a name service database to remove the association between the non-zero port identifier value and the prior Fibre Channel address.

25. The method of claim 19, wherein the act of receiving a second frame comprises receiving a second Fibre Channel link service frame.

26. The method of claim 19, wherein the device is a host bus adaptor.

27. A Fibre Channel switch device, comprising:
a port for coupling to a device port on a device;
a database means for storing at least a portion of a Fibre Channel login (FLOGI) database;
a control means for executing program instructions; and
a storage means, readable by the control means, having instructions for causing the control means to:
receive a first frame indicating a fabric login request from the device port through the port;
log the device into a Fibre Channel network a first time in response to the first frame;
receive a second frame indicating a fabric login request from the device port through the port, while the device is logged into the Fibre Channel network; and
log the device into the Fibre Channel network a second time in response to the second frame while still logged on a first time.

28. The Fibre Channel switch device of claim 27, wherein the first frame has a non-zero port identifier value and wherein the instructions to log the device into a Fibre Channel network a first time comprise instructions to:
obtain a first new Fibre Channel address value;
associate the first new Fibre Channel address value and the first non-zero port identifier value in the database means.

29. The Fibre Channel switch device of claim 28, further comprising instructions to send an accept frame to the device, the accept frame including the first non-zero port identifier value and the first new Fibre Channel address value.

30. The Fibre Channel switch device of claim 29, further comprising instructions to update a name service database with the first non-zero port identifier value and the first new Fibre Channel address value.

31. The Fibre Channel switch device of claim 27, wherein the second frame has a non-zero port identifier value and wherein the instructions to receive a second frame further comprise instructions to determine if the second non-zero port identifier value is associated with a prior Fibre Channel address in the database means and, if it is, remove the association between the second non-zero port identifier value and the prior Fibre Channel address.

32. The Fibre Channel switch device of claim 31, further comprising instructions to update a name service database to remove the association between the second non-zero port identifier value and the prior Fibre Channel address.

33. The Fibre Channel switch device of claim 27, wherein at least a portion of the database means comprises a Fibre Channel login (FLOGI) database.

34. The Fibre Channel switch device of claim 27, wherein the instructions to receive first and second frames comprise instructions to receive non-zero port world-wide name identifier values.

35. The Fibre Channel switch device of claim 27, wherein the instructions to receive a first frame comprise instructions to receive a Fibre Channel login (FLOGI) link service frame.

36. The Fibre Channel switch device of claim 35, wherein the FLOGI frame includes a zero source device identifier value.

37. The Fibre Channel switch device of claim 27, wherein the device is a host bus adaptor.

38. A Fibre Channel switch, comprising:
a port for coupling to a device port on a device;
a database storing at least a portion of a Fibre Channel login (FLOGI) database; and
a login processor coupled to said port and said database, wherein said login processor receives a first frame indicating a fabric login request from the device port through said port, logs the device into a Fibre Channel network a first time in response to the first frame, receives a second frame indicating a fabric login request from the device port through said port, while the device is logged into the Fibre Channel network, and logs the device into the Fibre Channel network a second time in response to the second frame while still logged on a first time.

39. The Fibre Channel switch of claim 38, wherein the first frame has a non-zero port identifier value and wherein said login processor logging the device into a Fibre Channel network a first time includes:
obtaining a first new Fibre Channel address value;
associating the first new Fibre Channel address value and the first non-zero port identifier value in said database.

40. The Fibre Channel switch of claim 39, wherein said login processor further sends an accept frame to the device, said accept frame including said first non-zero port identifier value and said first new Fibre Channel address value.

41. The Fibre Channel switch of claim 40, wherein said login processor further updates a name service database with said first non-zero port identifier value and said first new Fibre Channel address value.

42. The Fibre Channel switch of claim 38, wherein the second frame has a non-zero port identifier value and wherein said login processor receiving a second frame further includes determining if the second non-zero port identifier value is associated with a prior Fibre Channel address in said database and, if it is, remove the association between the second non-zero port identifier value and the prior Fibre Channel address.

43. The Fibre Channel switch of claim 42, wherein said login processor further updates a name service database to remove the association between the second non-zero port identifier value and the prior Fibre Channel address.

44. The Fibre Channel switch of claim 38, wherein at least a portion of said database comprises a Fibre Channel login (FLOGI) database.

45. The Fibre Channel switch of claim 38, wherein said login processor receiving first and second frames includes receiving non-zero port world-wide name identifier values.

46. The Fibre Channel switch of claim 38, wherein said login processor receiving a first frame includes receiving a Fibre Channel login (FLOGI) link service frame.

47. The Fibre Channel switch of claim 46, wherein said FLOGI frame includes a zero source device identifier value.

48. The Fibre Channel switch of claim 38, wherein the device is a host bus adaptor.

49. A Fibre Channel network login method for a device, comprising:
  providing a first frame indicating a fabric login request through a device port coupled to a switch port;
  receiving and storing a first Fibre Channel address value resulting from being logged into the Fibre Channel network a first time;
  providing a second frame indicating a fabric login request through the device port coupled to the switch port while the device is logged onto the Fibre Channel network; and
  receiving and storing a second Fibre Channel address value in addition to the first Fibre Channel address value resulting from being logged into the Fibre Channel network a second time while still logged on the first time.

50. The method of claim 49, wherein the act of providing the first frame includes providing a first Fibre Channel login (FLOGI) frame having a first non-zero port identifier value.

51. The method of claim 50, wherein the FLOGI frame has a zero source device identifier value.

52. The method of claim 50, wherein the act of receiving and storing the first Fibre Channel address value includes receiving an accept frame including the first non-zero port identifier value and the first Fibre Channel address value.

53. The method of claim 49, wherein the act of providing the second frame includes providing a frame having a second non-zero port identifier value.

54. The method of claim 49, wherein the act of providing a second frame includes providing a second Fibre Channel link service frame.

55. The method of claim 49, wherein the device is a host bus adaptor.

56. A Fibre Channel node, comprising:
  a bus adaptor port for coupling to a switch port on a switch;
  a processor for executing program instructions; and
  a driver executed in said processor and having instructions for causing the host to:
    provide a first frame indicating a fabric login request through said bus adaptor port coupled to the switch port;
    receive through said bus adaptor port and store a first Fibre Channel address value resulting from being logged into the Fibre Channel network a first time;
    provide a second frame indicating a fabric login request through said bus adaptor port coupled to the switch port while the node is logged onto the Fibre Channel network; and
    receive through said bus adaptor port and store a second Fibre Channel address value in addition to the first Fibre Channel address value resulting from being logged into the Fibre Channel network a second time while still logged on the first time.

57. The Fibre Channel node of claim 56, wherein the act of providing the first frame includes providing a first Fibre Channel login (FLOGI) frame having a first non-zero port identifier value.

58. The Fibre Channel node of claim 57, wherein the FLOGI frame has a zero source device identifier value.

59. The Fibre Channel node of claim 57, wherein the act of receiving and storing the first Fibre Channel address value includes receiving an accept frame including the first non-zero port identifier value and the first Fibre Channel address value.

60. The Fibre Channel node of claim 56, wherein the act of providing the second frame includes providing a frame having a second non-zero port identifier value.

61. The Fibre Channel node of claim 56, wherein the act of providing a second frame includes providing a second Fibre Channel link service frame.

62. The Fibre Channel node of claim 56, wherein the node is a server and further includes a host bus adaptor.

* * * * *